United States Patent [19]

Rijckaert et al.

[11] Patent Number: 5,412,515
[45] Date of Patent: May 2, 1995

[54] APPARATUS FOR RECORDING AND/OR REPRODUCING AN ELECTRIC SIGNAL ON/FROM A MAGNETIC RECORD CARRIER

[75] Inventors: Albert M. A. Rijckaert; Joannes A. E. Van Der Kop, both of Eindhoven, Netherlands

[73] Assignee: U.S. Philips Corporation, New York, N.Y.

[21] Appl. No.: 345,396

[22] Filed: May 1, 1989

[30] Foreign Application Priority Data

Jun. 14, 1988 [NL] Netherlands .................. 8801513

[51] Int. Cl.$^6$ .................. G11B 5/09; G11B 15/14
[52] U.S. Cl. .................. 360/48; 360/64
[58] Field of Search .................. 360/10.2, 33.1, 36.1, 360/22, 64, 84, 85, 95, 121, 9.1; 358/312, 337, 166, 167

[56] References Cited

U.S. PATENT DOCUMENTS

| | | | |
|---|---|---|---|
| 4,458,271 | 7/1984 | Horstmann | 360/22 |
| 4,542,417 | 9/1985 | Ohta | 360/9.1 |
| 4,757,392 | 7/1988 | Awamoto et al. | 360/27 |
| 4,922,359 | 5/1990 | Nakamura | 360/84 |

OTHER PUBLICATIONS

"An Experimental Digital Video Recording System", Driessen et al., IEEE vol. (E-32, No. 3, Aug. 1986 pp. 362-369.

Primary Examiner—Aristotelis Psitos
Assistant Examiner—Won-Tae C. Kim
Attorney, Agent, or Firm—Edward W. Goodman

[57] ABSTRACT

An apparatus for recording an electric signal (A) on a magnetic record carrier (1) includes at least one pair of write heads ($K_1$, $K_2$) having a mechanically rigid coupling to each other and arranged on a head drum (40). The record carrier (1) is wrapped around the head drum through a wrapping angle $\alpha$. The pair of heads ($K_1$, $K_2$) writes pairs of tracks ($T_1$, $T_2$; $T_3$, $T_4$; ...) on the record carrier. The apparatus further includes a signal separator (4) for dividing the electric signal into consecutive blocks, after which the signal blocks having odd sequence number ($B_1$, $B_3$, ...) are applied to a first output (5) and the signal blocks having even sequence number ($B_2$, $B_4$ ...) are applied to a second output (6). In a time-base correction circuit (7) the signal blocks ($A_1$, $A_2$) are time expanded or compressed. $\alpha$ Differs from 180°. Signal blocks having odd sequence numbers are delayed in time relative to signal blocks having even sequence numbers (16). Subsequently, the signal blocks thus processed are recorded. Time compression or expansion is effected by a factor of $\alpha*n/(180*(M+1))$, where n is the number of head pairs and M is the number of times within a specific time interval that a head pair which comes in contact with a record carrier during said time interval does not record a signal in the record carrier, this time interval being defined by those instants at which two consecutive track pairs are recorded by one or two head pairs.

8 Claims, 3 Drawing Sheets

APPARATUS FOR RECORDING AND/OR REPRODUCING AN ELECTRIC SIGNAL ON/FROM A MAGNETIC RECORD CARRIER

BACKGROUND OF THE INVENTION

1. Field of the Invention

The invention relates to an apparatus for recording an electric signal on a magnetic record carrier in tracks which are inclined relative to the longitudinal direction of said record carrier, and to an apparatus for reproducing a signal recorded by means of such a recording apparatus.

2. Description of the Related Art

European Patent Application 210,773 discloses a recording apparatus as defined in the opening paragraph, comprising an input terminal for receiving the electric signal;

a signal separator, having an input coupled to the input terminal, for dividing the electric signal into consecutive blocks having a specific length of time, and for applying the consecutive blocks,to a first and a second output in such a way that blocks having odd sequence numbers are applied to the first output and blocks having even sequence numbers are applied to the second output;

a time-base correction circuit which is constructed to provide time compression or time expansion of the consecutive blocks, to delay blocks having odd sequence numbers relative to those having even sequence numbers and to supply the two signals thus processed to a first and a second output, respectively; and at least one pair of write heads having different azimuth angles and arranged on a rotatable head drum, one write head of a pair being arranged to be coupled to the first output of the time-base correction circuit and the other write head of the same pair being arranged to be coupled to the second output of the time-base correction circuit.

The two write heads of a pair of write heads are regularly spaced along the drum circumference. The known apparatus can also be used as a reproducing apparatus, in which case it comprises:

at least one pair of read heads having different azimuth angles, and arranged on a rotatable head drum;

a time-base correction circuit having a first and a second input arranged to be coupled, respectively, to one read head and to the other read head of the pair of read heads, the correction circuit being constructed to provide a time compression or time expansion of the signal blocks applied to the first and the second inputs, respectively, to delay the signal blocks applied to one input relative to those applied to the other input; and a signal-combination unit, having a first and a second input and an output, for combining the signal blocks applied to the first and the second input in order to restore the electric signal and for feeding the electric signal to the output, the output being coupled to an output terminal for supplying the electric signal.

The known apparatus has the disadvantage that during operation it produces a high-acoustic noise level, that only very close dimensional tolerances of the components are permissible, and that sometimes the reproduction quality is not satisfactory.

SUMMARY OF THE INVENTION

The invention aims at mitigating these drawbacks and therefore proposes an apparatus for recording an electric signal which is characterized in that the write heads of a pair of write heads are arranged close to each other and have a mechanically rigid coupling to each other, and in that the time base correction circuit is adapted to provide a time expansion or time compression of the signal blocks by a factor of $\alpha*n/180*(M+1)$, where $\alpha$ is the wrapping angle of the record carrier around the head drum and differs from 180°, n is the number of head pairs, and M is the number of times within a specific time interval that a head pair which comes in contact with the record carrier during said time interval does not record a signal in the record carrier, this time interval being defined by those instants at which two consecutive track pairs are recorded by one or two head pairs. The apparatus for reproducing an electric signal is characterized in that the read heads of one pair of read heads are arranged close to each other and have a mechanically rigid coupling to each other, and in that the time-base correction circuit is adapted to provide a time compression or time expansion of the signal blocks applied to the first and the second input by a factor of $180*(M+1)/\alpha*n$, where $\alpha$ is the wrapping angle of the record carrier around the head drum and differs from 180°, n is the number of head pairs and M is the number of times within a specific time interval that a head pair which comes in contact with the record carrier during said time interval does not read a signal from the record carrier, the two track pairs being read consecutively by one or two head pairs.

As the heads of one pair of read or write heads are arranged at one location on the head drum, these heads hit against the record carrier only once every revolution of the head drum during recording and reproduction, which enables the acoustic noise level to reduced. In the case of head-level variations which manifest themselves similarly during every revolution of the head drum, for example as a result of wobbling or hunting of the head drum, the tracks written by the two heads of one pair of heads are yet recorded parallel to each other on the record carrier. The tracks may then be warped. However, if the apparatus comprises positioning means for positioning the head pair in a direction transverse to the track, said tracks can still be read[1] correctly. Moreover, if the positioning means are constructed as a dynamic tracking system, only one actuator is needed, on which the pair of heads is arranged.

In the known apparatus, in which the heads of a pair of write or read heads are spaced at 180° from each other along the head drum circumference and which comprises a dynamic tracking system, "false lock" may occur. This means that tracks are sometimes recorded or read in a wrong sequence. This is because the heads are not disposed at the same level relative to each other. Said false lock problem does not occur in the apparatus in accordance with the invention because the heads of a pair of write or read heads are now arranged close to each other and have a rigid mechanical coupling to each other, said heads being arranged, for example, on one actuator. Consequently a control system for maintaining the heads at the same level, as is required in the known apparatus, is not needed now.

In a first embodiment n=1 and M=0. This means that one head pair is arranged on the head drum and records or reads one track pair during every revolution of the head drum. If the wrapping angle is smaller than 180° the correction circuit in the recording apparatus should provide a time compression of the signal by a factor of $\alpha/180$ and, consequently, the correction circuit in the reproducing apparatus should provide a time expansion of the signal by a factor of $180/\alpha$. If the wrapping angle is larger than 180° the correction circuit in the recording apparatus should provide a time expansion of the signal and the correction circuit in the reproducing apparatus should provide a time compression of the signal.

In another embodiment n=1 and M=1. This means that only one head pair is arranged on the head drum. This head pair writes or reads one track pair during every two revolutions of the head drum. During recording the signal should then be time-compressed by a factor of $\alpha/360$ and during reproduction the signal must be time-expanded by a factor of $360/\alpha$.

The apparatus may be characterized further in that it comprises a second pair of write or read heads having different azimuth angles and arranged on the rotatable head drum, said second pair of heads being arranged close to each other and having a mechanically rigid coupling to each other.

An apparatus comprising two or more head pairs which are equidistantly spaced along the circumference enables information to be recorded or read at different tape speeds, but with a constant speed of rotation of the head drum.

An apparatus comprising two head pairs which are 180° spaced apart on the head drum can record at the "normal" tape speed and at a tape speed which is twice as high. In the first case, only one pair of heads records adjoining tracks on the record carrier. For the parameters n and M this means that n=2 and M=1. At a tape speed which is twice as high, a spacing will be obtained between two tracks recorded directly after each other by one pair of heads, in which spacing the other pair of heads can record exactly one track. At this speed both pairs of heads consequently record tracks on the record carrier. For the parameters n and M, this means that n=2 and M=0.

Obviously, the same applies during reproduction. If during recording the tracks have been recorded at the normal tape speed, only one pair of read heads is used for reading the information during reproduction. If during recording the tracks have been recorded at twice the normal tape speed, both pairs of read heads are used during reproduction, the tape speed being equal to that during recording.

The information recorded by the second pair of write heads may comprise additional information, for example the finest detail of an encoded video picture or an entirely different signal, or it enables a higher resolution standard to be adopted.

Recording or reading information at different tape speeds and constant speed of rotation of the head drum is also possible in the case of more than two pairs of write or read heads. For example, in the case of three pairs of heads writing and reading at the normal tape speed is effected with one write head or read head (n=3 and M=2), while at three times the speed, all the three heads are operative (n=3 and M=0).

It is to be noted that recording and reproducing a digital video signal by means of at least one pair of heads which are arranged close to each other and which have a mechanically rigid coupling with each other is known and is described in the publication "An experimental digital video recording system" by Driessen et al in IEEE Trans. on CE, Vol. CE-32, No. 3, August 1986, pp.362–70. However, in this system, the video signal is not time compressed or expanded. Neither is one signal component delayed in time relative to the other.

BRIEF DESCRIPTION OF THE DRAWINGS

Some embodiments of the invention will now be described in more detail, by way of example, with reference to the accompanying drawings. In the drawings

DESCRIPTION OF THE PREFERRED EMBODIMENT

Figure 1:
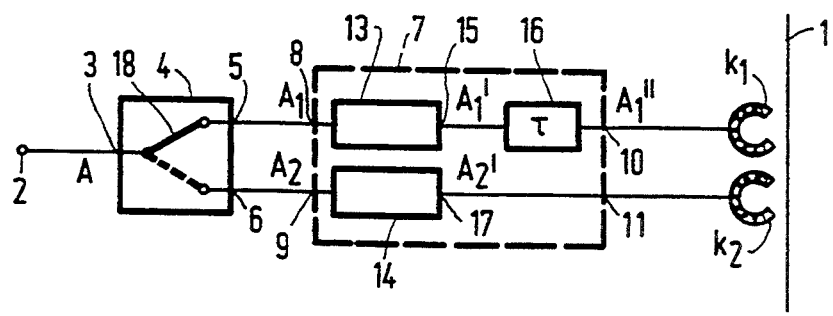
FIG. 1 shows an apparatus for recording an electric signal.

FIG. 1 shows diagrammatically an apparatus for recording an electric signal, for example a digital video signal on a magnetic record carrier 1. The apparatus comprises an input terminal 2 to which the electric signal can be applied. The input terminal 2 is coupled to an input 3 of a signal separator 4. The signal separator 4 is intended for dividing the electric signal applied to the input 3 into consecutive blocks of a specific length of time and for applying these consecutive blocks to a first output 5 and a second output 6. Blocks having odd sequence numbers are applied to the output 5. Blocks having even sequence numbers are applied to the output 6. The signal separator 4 may be constructed as a switch 18. A time-base correction circuit 7 has two inputs 8 and 9 coupled to the respective outputs 5 and 6 of the separator 4, and two outputs 10 and 11 coupled to the write heads $K_1$ and $K_2$ respectively. The write heads $K_1$ and $K_2$ constitute a pair of heads having a mechanically rigid coupling to each other, see FIGS. 3 and 4, and arranged close to each other at a location along the circumference of a head drum 40, see FIG. 4. The heads have different azimuth angles. The time base correction circuit 7 is constructed to provide a time compression or expansion of the signal blocks applied to the inputs 8 and 9 and to delay the signal blocks applied to one input (in the present case the input 8) relative to those applied to the other input (input 9) by a specific time interval $\tau$. In fact $\tau$ is half the revolution period of the head drum for n=1.

Depending on the parameters $\alpha$ (the wrapping angle), n (the number of head pairs) and M, the time-base correction circuit 7 should provide a time expansion or compression of both signals by a factor of $\alpha*n/180*(M+1)$. The correction circuit 7 then comprises two expansion or compression units 13 and 14, respectively, which time expand or time compress the signals applied to the inputs 8 and 9. M is the number of times within a specific time interval that one or two head pairs come in contact with the record carrier, without a signal being recorded in the record carrier. The time interval is defined by those instants at which one head pair records two consecutive track pairs. In the present embodiment, n=1 and M=0. The output 15 of the expansion/compression unit 13 is connected to the output 10 of the correction circuit 7 via a signal delay unit 16 in which the output signal of the unit 13 is delayed by a time interval $\tau$. The output 17 of the unit 14 is coupled to the output 11 of the correction circuit 7.

If the record carrier 1 has a wrapping angle $\alpha$ smaller than 180°, for example 90°, the correction circuit 7 should time compress the signals applied to the inputs 8 and 9 by a factor of $\alpha/180$. The correction circuit 7 then comprises units 13 and 14 which provide time compression of the signals. Conversely, if $\alpha$ is larger than 180° the units 13 and 14 will provide time expansion of the signals.

The operation of the apparatus shown in FIG. 1 will now be described with reference to FIGS. 2 and 3.

Figure 2A:
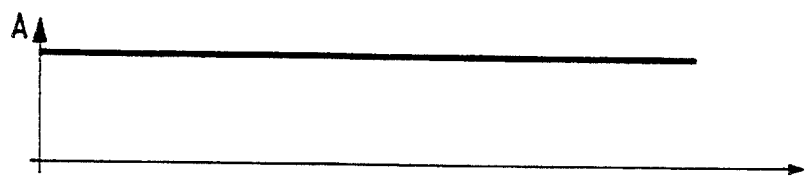
FIGS. 2a–2f show the signal waveforms at various points in the apparatus of FIG. 1.
Figure 2B:
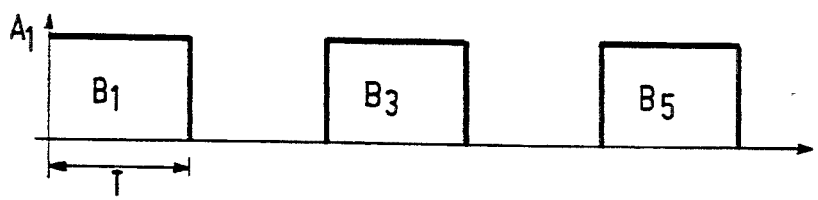
Figure 2C:
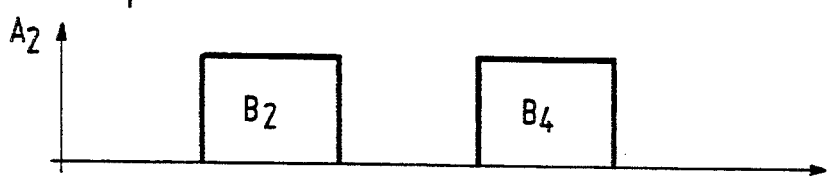
Figure 2D:
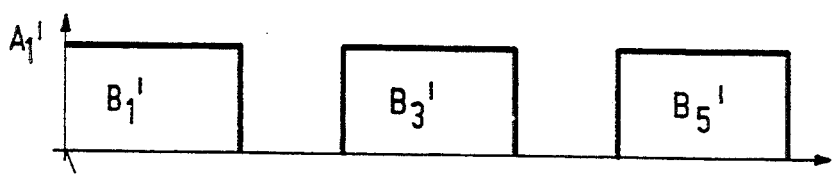
Figure 2E:
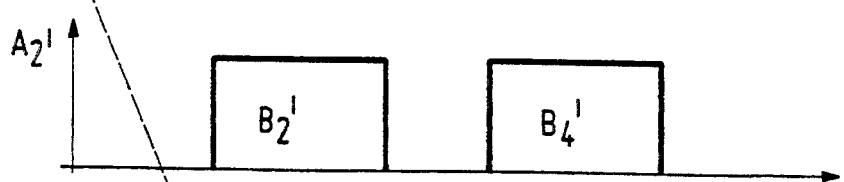
Figure 2F:
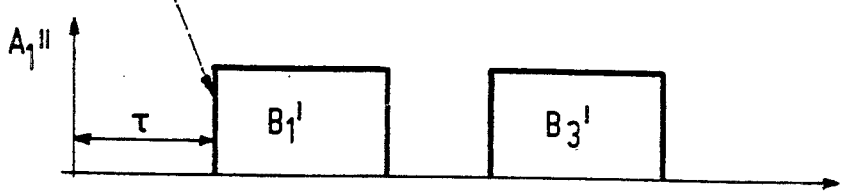

A signal A (=A(t)) as a function of time, which is represented diagrammatically in FIG. 2a, is applied to the input terminal 2 of the apparatus. The signal separator 4 divides the signal into consecutive blocks $B_1$, $B_2$, $B_3$, ... etc. of a specific length of time T. Blocks having odd sequence numbers are applied to the output 5. The switch 18 is then in the upper position. Blocks having even sequence numbers are applied to the output 6. The switch 18 is then in the lower position. The signals A1 and A2, see FIGS. 2b and 2c respectively, are then available on the output 5 and 6, respectively. Since the wrapping angle $\alpha$ is larger than 180°, see FIG. 4, the signals A1 and A2 are time-expanded by a factor of $\alpha/180$ in the units 13 and 14. This results in the signals A1' and A2' on the outputs 15 and 17, see FIGS. 2d and 2e, respectively. In the time delay unit 16, the signal A1' is delayed by a time interval $\tau$, so that the signal A1'', see FIG. 2f, is applied to the write head $K_1$. Consequently, $\tau$ is equal to T. The signal A2' is applied to the write head $K_2$.

The blocks B1' and B2' are respectively recorded in tracks $T_1$ and $T_2$ on the record carrier 1 by the heads $K_1$ and $K_2$ respectively, more or less concurrently, which depends on the positions of the heads relative to each other. During a subsequent revolution of the head drum, the blocks B3' and B4' are respectively recorded in the tracks $T_3$ and $T_4$ by the heads $K_1$ and $K_2$ respectively, substantially at the same time, see FIG. 3.

It is obvious that the sequence of the time-base correction circuit 13 and the delay unit 16 may be reversed.

It is also possible to divide the signal into a serial data stream of signal blocks before the switch 18 and to compress or to expand these signal blocks before the switch 18. The compressed or expanded signal blocks are then applied to the inputs 8 and 9 of the unit 7 by the switch 18 in such a way that signal blocks having odd sequence numbers are fed to one input and signal blocks having even sequence numbers are fed to the other input of the unit 7. In this case the unit 7 only comprises the time delay means 16.

Figure 3:
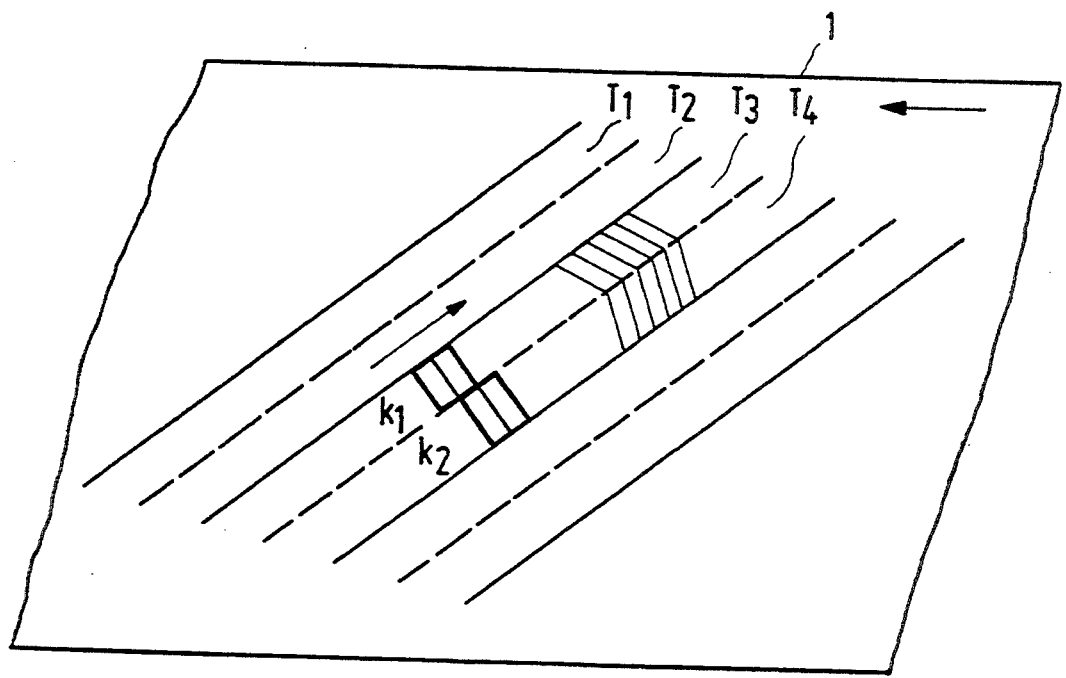
FIG. 3 shows the magnetic record carrier with the information tracks recorded on it by a write head.
Figure 4:
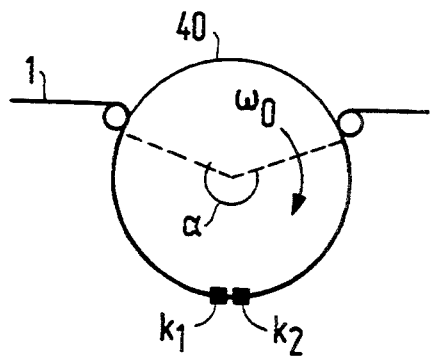
FIG. 4 shows the construction of the head drum.
Figure 5:
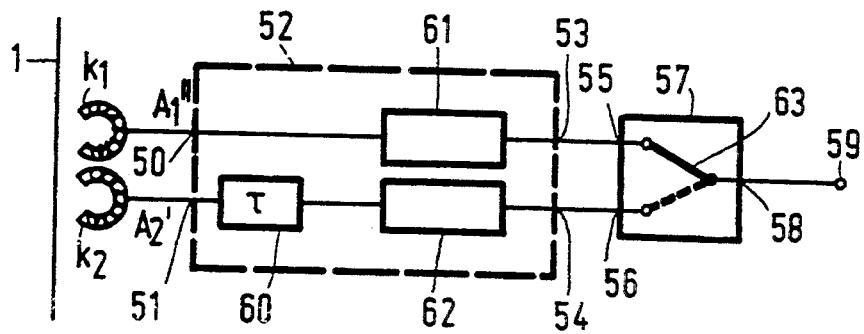
FIG. 5 shows an apparatus for reproducing an electric signal.

FIG. 5 shows an apparatus for reading the electric signal from the record carrier 1 in FIG. 3. The apparatus comprises a pair of read heads $K_1$ and $K_2$, see FIG. 3, which have a mechanically rigid coupling with each other and which are arranged close to one another on a rotatable head drum 40. These heads are coupled to inputs 50 and 51 of a time base correction circuit 52. Two outputs 53 and 54 of the circuit 52 are coupled to inputs 55 and 56, respectively, of a signal combination unit 57, which has an output 58 coupled to the output terminal 59. The wrapping angle $\alpha$ of the record carrier 1 around the head drum 40 is again assumed to be larger than 180°, see FIG. 4.

The apparatus shown in FIG. 5 should process the signal read from the record carrier 1 in a manner which is the inverse of the signal processing by means of the apparatus shown in FIG. 1. Since the heads $K_1$ and $K_2$ of the apparatus shown in FIG. 5 scan the same tracks as those recorded by the heads $K_1$ and $K_2$ of the apparatus shown in FIG. 1, this means that the signal A2' read by the head $K_2$ (from the tracks $T_2$, $T_4$, $T_6$, ... etc.) should now be delayed by said time interval $\tau$. This is effected in the time delay unit 60 of the correction circuit 52. The correction circuit 52 further comprises time-compression units 61 and 62 in which the signals read by the heads $K_1$ and $K_2$ are time-compressed. The blocks $B_1$, $B_2$, $B_3$, ... at the outputs 53 and 54 then again have a length T and are now situated correctly relative to one another along the time axis. By setting the switch 63 in the combination unit 57 from the upper position to the lower position and vice versa, the original electric signal is restored, and is available on the output terminal 59.

If the signals A1 and A2 have been compressed during recording because the wrapping angle $\alpha$ is smaller than 180°, the signals read from the record carrier will have to be expanded in the units 61 and 62 in order to recover the original signal.

Moreover, it is obvious that the sequence of the delay means 60 and the unit 62 may be reversed. The blocks, which then take the form of a serial data stream, may now again be time-compressed after the switch 63.

An apparatus in accordance with the invention comprising one pair of closely spaced heads with a mechanically rigid coupling is also capable of reading record carriers recorded by means of the present RDAT recorders.

RDAT recorders have two heads which are arranged diametrally opposite one another on the head drum. The record carrier is wrapped around the head drum through an angle of 90° or 135°.

If in such an RDAT recorder the two heads are closely spaced to each other and coupled to each other in a mechanically rigid manner, so as to obtain a construction as shown in FIG. 3, it is possible to process the normal RDAT format track pattern on the record carrier (n=1 and M=1) by reading (or writing) only once every two revolutions.

Figure 6A:
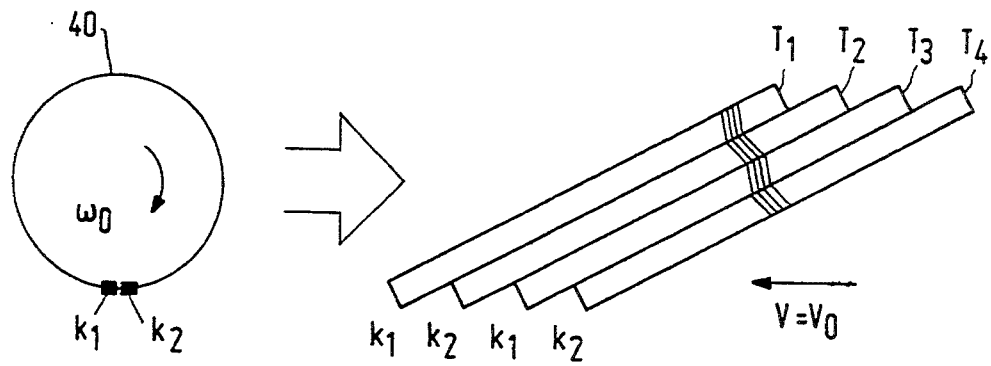
FIG. 6a–6b shows the track pattern recorded by the apparatus shown in FIG. 1 for two different transport speeds of the record carrier.
Figure 6B:
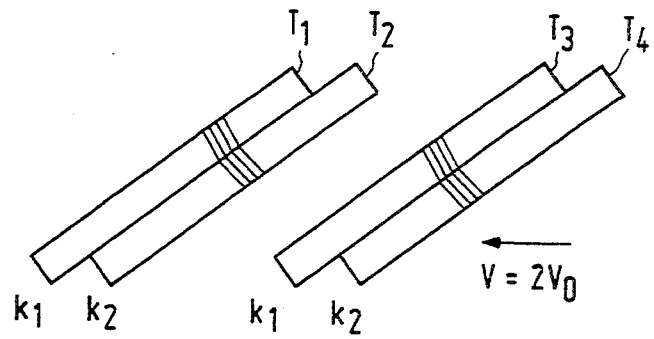
Figure 7:
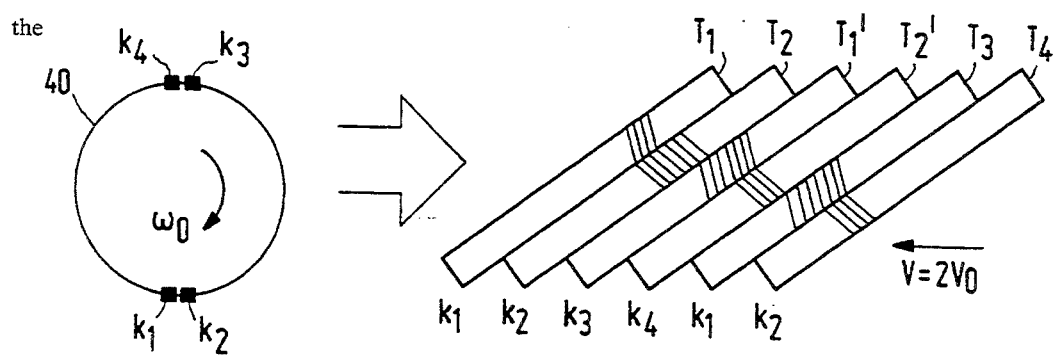
FIG. 7 shows the head drum and the associated track pattern for an apparatus comprising two pairs of heads.

Such a recording apparatus enables a signal with a bit rate which is a factor of 2 higher than that applied to the input terminal to be recorded on the record carrier, namely by increasing the speed of transport of the record carrier by a factor of 2 (see FIG. 6b) and by recording once every revolution (n=1 and M=0), see the track pattern in FIG. 7. The constructional parameters and the channel electronics can be the same because the bit rate of the signal which is effectively recorded in fact remain the same.

Obviously, the same applies to the reproduction process.

It is also possible to provide a recording or reproducing apparatus in accordance with the invention with two or more pairs of write/read heads which are mechanically coupled to each other in a rigid manner.

Such a construction has special advantages because it is then possible to record and read at different speeds.

FIG. 6a again shows the track pattern as recorded on the record carrier 1 by the apparatus shown in FIG. 1 at a normal tape speed $V_0$. If it is assumed that the tape speed has been twice as high, the same information, i.e. the complete signal A in FIG. 2a, will be recorded on the record carrier by means of the heads $K_1$ and $K_2$ in a pattern as shown in FIG. 6b. In fact, a spacing is now formed between the pairs of tracks $T_1$, $T_2$ and $T_3$, $T_4$ in which spacing additional information may be recorded. If the tape speed is $2V_0$, the spacing will be so large that exactly two tracks can be recorded on the record carrier by means of a second pair of rigidly mechanically coupled heads $K_3$ and $K_4$, see FIG. 7, which are arranged exactly opposite the first pair of heads $K_1$, $K_2$ on the head drum.

FIG. 7 clearly shows that two tracks $T_1'$, $T_2'$ are recorded between the pairs of tracks $T_1$, $T_2$ and $T_3$, $T_4$ by means of the heads $K_3$ and $K_4$.

The information recorded in the tracks $T_1'$, $T_2'$ is the additional information. This information may represent, for example, the finest details of an encoded video picture or it enables a higher resolution standard to be used.

Thus a recording and/or reproducing apparatus comprising two pairs of heads can be operated in two ways.

In the case of a normal transport speed $V_0$, this apparatus will operate as described with reference to FIGS. 1 to 5. Only one pair of heads is used for recording and/or reading the information (n=2 and M=1).

In the case of a speed of transport equal to $2V_0$, both pairs of heads are used for recording and/or reading the information (n=2 and M=0). Each pair of heads again functions as described with reference to FIGS. 1 to 5. The heads $K_1$ and $K_2$ record and/or read the information of FIG. 2a. The heads $K_3$ and $K_4$ record and/or read additional information as stated above.

It is also possible to record a different type of information in the tracks $T_1'$ and $T_2'$. For example, if in the tracks $T_1$, $T_2$, $T_3$, $T_4$, . . . etc. video information is recorded it is possible to record audio information in the tracks $T_1'$, $T_2'$, . . . etc.

It is to be noted that the scope of the invention is not limited to the embodiments shown herein, The invention also relates to apparatuses which differ from the embodiments shown herein in respects which are not relevant to the present invention. For example, said one or more pairs of heads may each be provided with positioning means for positioning a pair of heads in a direction transverse to the tracks. This may mean that the tape transport is controlled in such a way that one pair of heads is positioned exactly at the appropriate adjacent tracks. Another possibility is to arrange one pair of heads on a piezoelectric actuator and to control the piezoelectric actuator in such a way that the pair of heads is positioned exactly at the appropriate pair of adjacent tracks.

It is alternatively possible to record or read, for example, audio information at a tape transport speed of $V_0$ by means of one head pair $K_1$, $K_2$ once every two revolutions and to record or read video information at a tape transport speed of $4V_0$ by means of the head pairs $K_1$, $K_2$ and $K_3$, $K_4$ during every revolution.

What is claimed is:

1. An apparatus for recording an electric signal on a magnetic record carrier in tracks which are inclined relative to the longitudinal direction of said record carrier, comprising:

an input terminal for receiving the electric signal;

a signal separator, having an input coupled to the input terminal, for dividing the electric signal into consecutive blocks having a specific length of time, and for applying the consecutive blocks to a first and a second output in such a way that blocks having odd sequence numbers are applied to the first output and blocks having even sequence numbers are applied to the second output;

a time-base correction circuit having a first and a second input coupled, respectively, to the first and second outputs of said signal separator, said time-base correction circuit providing time compression or time expansion of the consecutive blocks, delaying blocks having odd sequence numbers relative to those having even sequence numbers, and supplying the two signals thus processed to a first and a second output, respectively; and at least one pair of write heads having different azimuth angles and arranged on a rotatable head drum, one write head of a pair being arranged to be coupled to the first output of the time-base correction circuit and the other write head of the same pair being arranged to be coupled to the second output of the time-base correction circuit;

characterized in that the write heads of one pair of write heads are arranged close to each other and have a mechanically rigid coupling to each other, and the time-base correction circuit provides a time expansion or time compression of the signal blocks by a factor of $\alpha*n/(180*(M+1))$, where $\alpha$ is the wrapping angle of the record carrier around the head drum and differs from 180°, n is the number of head pairs, and M is the number of times within a specific time interval that a head pair which comes in contact with the record carrier during said time interval does not record a signal on the record carrier, said time interval being defined by those instants at which two consecutive track pairs are recorded by one or two head pairs.

2. An apparatus for reproducing an electric signal from tracks on a magnetic record carrier, said tracks being inclined relative to the longitudinal direction of said record carrier, said electric signal having been recorded by means of the apparatus as claimed in claim 1, comprising:

at least one pair of read heads having different azimuth angles, and arranged on a rotatable head drum;

a time-base correction circuit having a first and a second input arranged to be coupled, respectively, to one read head and to the other read head of the pair of read heads, said time-base correction circuit providing a time compression or time expansion of the signal blocks applied to the first and the second inputs, respectively, and delaying the signal blocks applied to one input relative to those applied to the other input, said time-base correction circuit having a first and a second output to which said blocks, applied to the first and second inputs, are applied after being processed in said time-base correction circuit; and a signal-combination unit having a first and a second input, coupled, respectively, to the first and second outputs of said time-base correction circuit, and an output, for combining the signal blocks applied to the first and second inputs in order to restore the electric signal and for feeding the electric signal to the output, the output being coupled to an output terminal for supplying the electric signal;

characterized in that the read heads of one pair of read heads are arranged close to each other and have a mechanically rigid coupling to each other, and the timebase correction circuit provides a time compression or time expansion of the signal blocks applied to the first and the second inputs by a factor of $180*(M+1)/(\alpha*n)$, where $\alpha$ is the wrapping angle of the record carrier around the head drum and differs from 180°, n is the number of head pairs, and M is the number of times within a specific time interval that a head pair, which comes in contact with the record carrier during said time interval, does not read a signal from the record carrier, said time interval being defined by those instants at which two track pairs are read consecutive by one or two head pairs.

3. An apparatus as claimed in claim 1 or 2, characterized in that $n=1$ and $M=0$.

4. An apparatus as claimed in claim 1 or 2, characterized in that $n=1$ and $M=1$.

5. An apparatus as claimed in claim 1 or 2, characterized in that the apparatus comprises positioning means for positioning the read or write heads of one pair of heads in a direction transverse to the track.

6. An apparatus as claimed in claim 5, characterized in that for the purpose of positioning the pair of heads is arranged on an actuator.

7. An apparatus as claimed in claim 1 or 2, characterized in that the rotatable head drum carries a second pair of write or read heads having different azimuth angles, arranged close to each other, and having a mechanically rigid coupling to each other.

8. An apparatus as claimed in claim 7, characterized in that the two pairs of heads are 180° spaced apart on the head drum.

* * * * *